US009776325B1

United States Patent
Hoffmann et al.

(10) Patent No.: US 9,776,325 B1
(45) Date of Patent: Oct. 3, 2017

(54) METHOD FOR TELE-ROBOTIC OPERATIONS OVER TIME-DELAYED COMMUNICATION LINKS

(71) Applicant: HRL Laboratories, LLC, Malibu, CA (US)

(72) Inventors: Heiko Hoffmann, Simi Valley, CA (US); David W. Payton, Calabasas, CA (US); Vincent De Sapio, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 94 days.

(21) Appl. No.: 14/073,624

(22) Filed: Nov. 6, 2013

Related U.S. Application Data (60) Provisional application No. 61/780,214, filed on Mar. 13, 2013.

(51) Int. Cl.
*B25J 9/16* (2006.01)

(52) U.S. Cl.
CPC .......... *B25J 9/1671* (2013.01); *B25J 9/163* (2013.01); *B25J 9/1605* (2013.01); *G05B 2219/40414* (2013.01)

(58) Field of Classification Search
CPC ........ B25J 9/1605; B25J 9/163; B25J 9/1671; B25J 9/1689
See application file for complete search history.

(56) References Cited

U.S. PATENT DOCUMENTS

| | | | |
|---|---|---|---|
| 6,445,964 B1 * | 9/2002 | White | B25J 9/1689 700/253 |
| 2005/0131582 A1 * | 6/2005 | Kazi et al. | 700/259 |
| 2012/0290130 A1 * | 11/2012 | Kapoor | 700/247 |

OTHER PUBLICATIONS

Mitra, P.; Niemeyer, G., "Mediating Time Delayed Teleoperation with User Suggested Models: Implications and Comparative Study," Haptic interfaces for virtual environment and teleoperator systems, 2008. haptics 2008. symposium on , vol., No., pp. 343,350, Mar. 13-14, 2008.*

(Continued)

*Primary Examiner* — Adam Mott
(74) *Attorney, Agent, or Firm* — Tope-McKay & Associates (57) ABSTRACT

Described is system for tele-robotic operations over time-delayed communication links. Sensor data is acquired from at least one sensor for sensing surroundings of a robot having at least one robotic arm for manipulating an object. A three-dimensional model of the sensed surroundings is generated, and the sensor data is fit to the three-dimensional model. Using the three-dimensional model, a user demonstrates a movement path for the at least one robotic arm. A flow field representing the movement path is generated and combined with obstacle-repellent forces to provide force feedback to the user through a haptic device. The flow field comprises a set of parameters, and the set of parameters are transmitted to the robot to execute a movement of the at least one robotic arm for manipulating the object.

18 Claims, 6 Drawing Sheets

(56) References Cited

OTHER PUBLICATIONS

Hoffmann, H.; Pastor, Peter; Park, Dae-Hyung; Schaal, S., "Biologically-inspired dynamical systems for movement generation: Automatic real-time goal adaptation and obstacle avoidance," Robotics and Automation, 2009. ICRA '09. IEEE International Conference on , vol., No., pp. 2587,2592, May 12-17, 2009.*

Kazerooni, H., Tsay, T.-I., & Hollerbach, K. (1993), A controller design framework for telerobotic systems. IEEE Transactions on Control Systems Technology , 1 (1), 50-62.

Kim, W., Hannaford, B., & Bejczy, A. (1992), Force-reflection and shared compliant control in operating telemanipulators with time delay. IEEE Transactions on Robotics and Automation , 8 (2), 176-185.

Haidegger, T., & Benyó, Z. (2010), Extreme Telesurgery. In S. H. Baik (Ed.), Robot Surgery (pp. 25-44), InTech.

Bejczy, A. K., Kim, W. S., & Venema, S. C. (1990). The Phantom Robot: Predictive Displays for Teleoperation with Time Delay, Proceedings of the 1990 IEEE International Conference on Robotics and Automation, 1, pp. 546-551, Cincinnati.

Johnston, M. D., & Rabe, K. J. (2006), Integrated planning for telepresence with time delays, Proceedings of the Second IEEE International Conference on Space Mission Challenges for Information Technology, (pp. 1-7). Pasadena.

Kadavasal, M. S., & Oliver, J. H. (2007), Sensor Enhanced Virtual Reality Teleoperation in Dynamic Environment. Proceedings of the 2007 IEEE Virtual Reality Conference, (pp. 297-298). Charlotte.

Mitra, P., & Niemeyer, G. (2008). Mediating Time Delayed Teleoperation with User Suggested Models: Implications and Comparative Study. 2008 Symposium on Haptic Interfaces for Virtual Environment and Teleoperator Systems, (pp. 343-350). Reno.

Best, Paul J.; N.D. McKay (1992), "A Method for Registration of 3-D Shapes", IEEE Trans. on Pattern Analysis and Machine Intelligence (Los Alamitos, CA, USA: IEEE Computer Society) 14 (2): 239-256.

Hoffmann, H., Pastor, P., Park, D,-H., & Schaal, S. (2009), Biologically-inspired dynamical systems for movement generation: Automatic real-time goal adaptation and obstacle avoidance. Proceedings of the 2009 IEEE International Conference on Robotics and Automation, (pp. 2587-2592), Kobe.

Park, D.H., Hoffmann, H., Pastor, P., & Schaal, S. (2008), Movement reproduction and obstacle avoidance with dynamic movement primitives and potential fields. Proceedings of the 8th IEEE-RAS International Conference on Humanoid Robots, (pp. 91-96).

Hoffmann, H. (2011), Target switching in curved human arm movements is predicted by changing a single control parameter. Experimental Brain Research, 208 (1), 73-87.

\* cited by examiner

METHOD FOR TELE-ROBOTIC OPERATIONS OVER TIME-DELAYED COMMUNICATION LINKS

CROSS-REFERENCE TO RELATED APPLICATIONS

This is a Non-Provisional patent application of U.S. Provisional Application No. 61/780,214, filed in the United States on Mar. 13, 2013, entitled, "Method for Tele-Robotic Operations Over Time-Delayed Communication Links."

BACKGROUND OF THE INVENTION (1) Field of Invention

The present invention relates to a system for tele-robotic control and, more particularly, to a system for tele-robotic control over time-delayed communication links.

(2) Description of Related Art

Tele-robotic operations at long distance (e.g., in space) face three main challenges: time delays in transmission and signal processing; limited situational awareness; and limited communication bandwidth. For example, for operations in the satellite disposal orbit, 300 kilometers (km) above the geostationary orbit (GEO), the speed-of-light communication imposes a lower limit on the delay (244 milliseconds (ms) round trip at 15 degrees inclination), which is further increased due to signal processing (typically >100 ms). With delays, teleoperations with a human and a robot in a closed loop becomes ineffective (see the List of Incorporated Cited Literature References, Literature Reference Nos. 1 and 2). A delay of 500 ms is considered disturbing, and a delay greater than 50 ms is noticeable. Moreover, delays can cause instabilities in robot control (see Literature Reference No. 3).

Several research efforts have dealt with compensating delays for teleoperating robots. One approach is a "bump and wait" strategy. With this strategy, the operator executes a command and waits until he/she observes its result. This strategy is usually tiring for the operator and leads to long overall execution times.

To improve operations, software has been suggested to predict the robot's movements on the operator's screen, referred to as a "predictive display" (see Literature Reference No. 4). This approach is limited by the requirement to accurately estimate the physics at the remote site. Particularly, the timing of contacts is almost impossible to predict more accurately than the delay.

Alternatively, Literature Reference No. 5 suggested a leader-follower model. Here, the operator plans the task in real time, while the robot tries to catch up with its execution; simultaneously, software on the operator's remote site checks for deviations against the plan and informs the operator. This approach requires a more high-level command-and-control structure and is unsuitable for more dexterous tasks with multiple contacts. Another alternative is to model the situation on the remote site and interact in closed loop with the model (see Literature Reference Nos. 6 and 7). Since the model does not need to be in closed loop with the remote site, delays and limits on the communication bandwidth are mitigated. However, this approach is limited by the accuracy of the model.

Each of the prior methods described above exhibit limitations that make them incomplete. Thus, a continuing need exists for a method that allows operator interactions with a model, but compensates for model inaccuracies. This method would enable the operator to practice robotic movements in simulation with a haptic device before they are executed on the robot.

SUMMARY OF THE INVENTION

The present invention relates to a system for tele-robotic control and, more particularly, to a system for tele-robotic control over time-delayed communication links. The system comprises one or more processors and a memory having instructions such that when the instructions are executed, the one or more processors perform multiple operations. Sensor data is acquired from at least one sensor for sensing surroundings of a robot having at least one robotic arm for manipulating an object. Then, a three-dimensional model of the sensed surroundings is generated, and the sensor data is fit to the three-dimensional model. The three-dimensional model is used to generate a movement path for the at least one robotic arm. A flow field representing the movement path is then generated and used in a simulation to provide force feedback to a user through a haptic device. The flow field comprises a set of parameters, and the set of parameters are transmitted to the robot to execute a movement of the at least one robotic arm for manipulating the object.

In another aspect, the flow field changes over time during execution of the movement of the at least one robotic arm.

In another aspect, a position and an orientation of the three-dimensional model are continuously updated based on incoming three-dimensional point cloud data generated from the sensor data.

In another aspect, an orientation of the flow field is updated according to updates in the three-dimensional model's position and orientation based on data received from the robot.

In another aspect, a user can label at least one obstacle in the three-dimensional model, wherein the at least one obstacle is augmented with at least one repellent force field having a strength that the user can regulate, and wherein the haptic device provides a force feedback having a strength that is proportional to a value representing the at least one repellent force field.

In another aspect, the user can practice the movement path through the flow field prior to transmitting the set of parameters to the robot; and if a problem occurs, the user can modify the at least one repellent force field; re-demonstrate the movement path; or edit the movement path.

As can be appreciated by one skilled in the art, in another aspect, the present invention also comprises a method for causing a processor to perform the operations described herein.

Finally, in another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for tele-robotic control and, more particularly, to a system for tele-robotic control over time-delayed communication links. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Kazerooni, H., Tsay, T.-I., & Hollerbach, K. (1993). A controller design framework for telerobotic systems. *IEEE Transactions on Control Systems Technology*, 1 (1), 50-62.
2. Kim, W., Hannaford, B., & Bejczy, A. (1992). Force-reflection and shared compliant control in operating telemanipulators with time delay. *IEEE Transactions on Robotics and Automation*, 8 (2), 176-185.
3. Haidegger, T., & Benyó, Z. (2010). Extreme Telesurgery. In S. H. Baik (Ed.), *Robot Surgery* (pp. 25-44). InTech.
4. Bejczy, A. K., Kim, W. S., & Venema, S. C. (1990). The Phantom Robot: Predictive Displays for Teleoperation with Time Delay. *Proceedings of the 1990 IEEE International Conference on Robotics and Automation*, 1, pp. 546-551. Cincinnati.
5. Johnston, M. D., & Rabe, K. J. (2006). Integrated planning for telepresence with time delays. *Proceedings of the Second IEEE International Conference on Space Mission Challenges for Information Technology*, (pp. 1-7). Pasadena.
6. Kadavasal, M. S., & Oliver, J. H. (2007). Sensor Enhanced Virtual Reality Teleoperation in Dynamic Environment. *Proceedings of the 2007 IEEE Virtual Reality Conference*, (pp. 297-298). Charlotte.
7. Mitra, P., & Niemeyer, G. (2008). Mediating Time Delayed Teleoperation with User Suggested Models: Implications and Comparative Study, 2008 *Symposium on Haptic huierfaces for Virtual Environment and Teleoperator Systems*, (pp. 343-350). Reno.
8. Besl, Paul J.; N. D. McKay (1992). "A Method for Registration of 3-D Shapes". IEEE Trans. on Pattern Analysis and Machine Intelligence (Los Alamitos, Calif., USA: IEEE Computer Society) 14 (2): 239-256.
9. Hoffmann, H., Pastor, P., Park, D.-H., & Schaal, S. (2009). Biologically-inspired dynamical systems for movement generation: Automatic real-time goal adaptation and obstacle avoidance. *Proceedings of the 2009 IEEE International Conference on Robotics and Automation*, (pp. 2587-2592). Kobe.
10. Park, D. H., Hoffmann, H., Pastor, P., & Schaal, S. (2008). Movement reproduction and obstacle avoidance with dynamic movement primitives and potential fields. *Proceedings of the 8th IEE-RAS International Conference on Humanoid Robots*, (pp. 91-98).
11. Hoffmann, H. (2011a). Target switching in curved human arm movements is predicted by changing a single control parameter. *Experimental Brain Research*, 208 (1), 73-87.

(2) Principal Aspects

The present invention has three "principal" aspects. The first is a system for tele-robotic control over time-delayed communication links. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for tele-robotic control over time-delayed communication links. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Specific Details

The present invention provides a solution for tele-robotic control when the communication between operator and robot is delayed. The key to circumventing the effects of communication and encryption latencies is to generate, or construct, a model of the robot's surroundings from three-dimensional (3D) point cloud data and allow the human operator to specify robotic arm motions in the context of that model. In one aspect, the present invention utilizes a flow field representation of a robotic movement to capture the operator's intent in such a way that even with changes in the relative pose between robot and surroundings, the remote robot arm will behave as expected. Moreover, the operator can feel this flow field with a haptic device and can practice robotic movements in simulation before they are executed on the robot.

Figure 1:
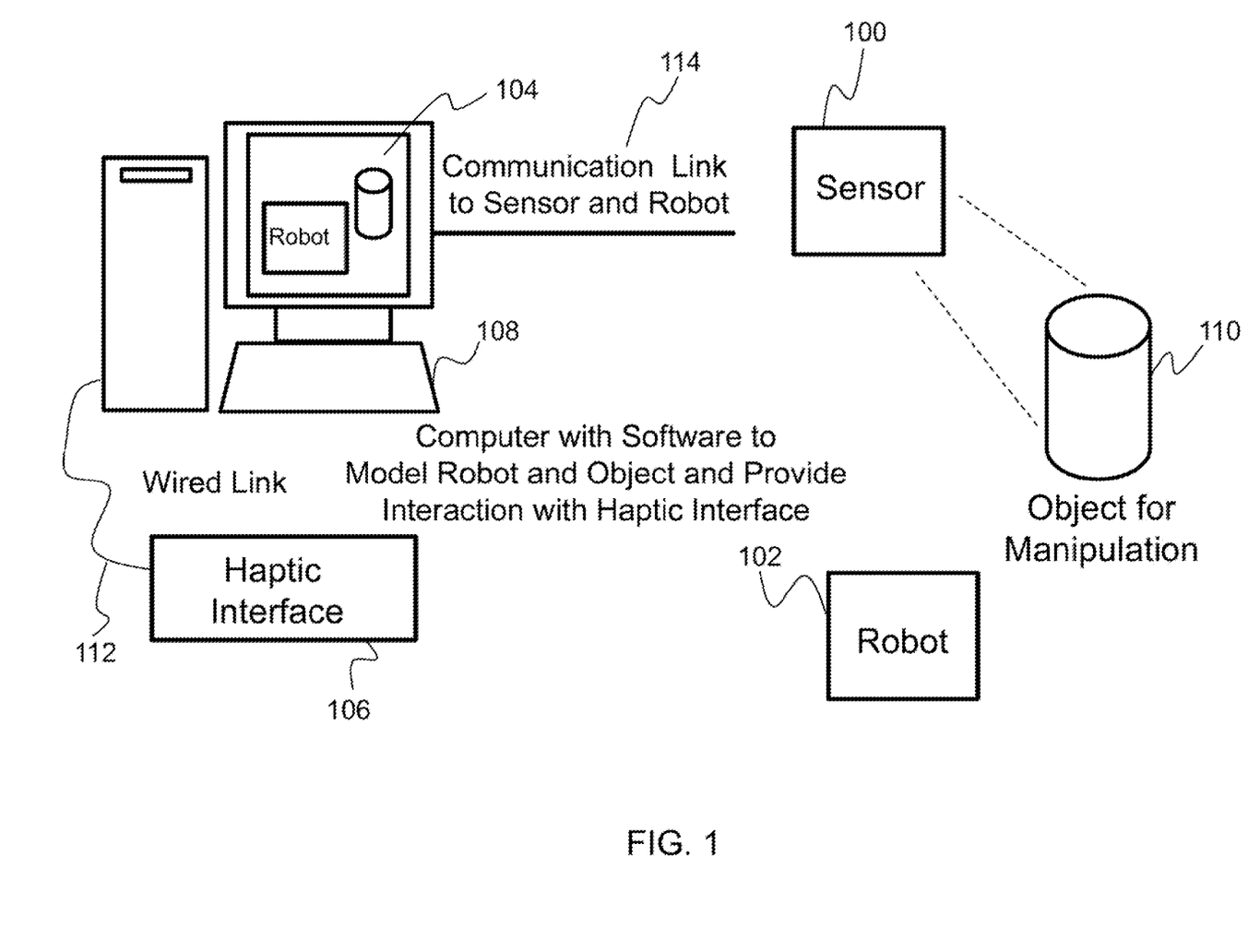
FIG. 1 is an illustration of the key components of a method for tele-robotic operations over time-delayed communication links according to the principles of present invention.

A significant purpose of the invention described herein is to command a robot through a distance (e.g., for robotic servicing of a satellite). The invention addresses the difficulty to cope with transmission and processing delays and limited situational awareness of the robot site. Several key elements according to the principles of the present invention are shown in FIG. 1. The tele-presence system comprises sensory acquisition through a sensor 100 (e.g., 3D camera, stereo camera), robotic execution software on the remote robot 102, and a human interface setup. The main elements of the human interface setup are a two-dimensional (2D) or 3D display 104 (e.g., computer screen), one (or more) 7-degree-of-freedom (DOF) (or any suitable number of degrees-of-freedom) haptic interfaces 106, and software on a computer 108 to model robot 100 arms and an object for manipulation 110 (e.g., retired satellite) as well as provide an interactive environment for planning robotic movements. A link 112 connects the computer 108 with the haptic interface 106. Further, the computer 108 includes a communication link 114 to the sensor 100 and the robot 102.

For a robotic sub-task, such as grasping a target object (i.e., object for manipulation 110), the approach will run through the following processes. First, sensory data is acquired with the sensor 100 on the robot 102. Second, a human-approved model is fit to the data under human supervision. Third, the human-approved model is used to plan and shape a path for the robot 102 arm, or movement plan. Fourth, the movement plan (flow field) is uploaded to the robot. Finally, the robotic executes the movement plan.

Figure 2:
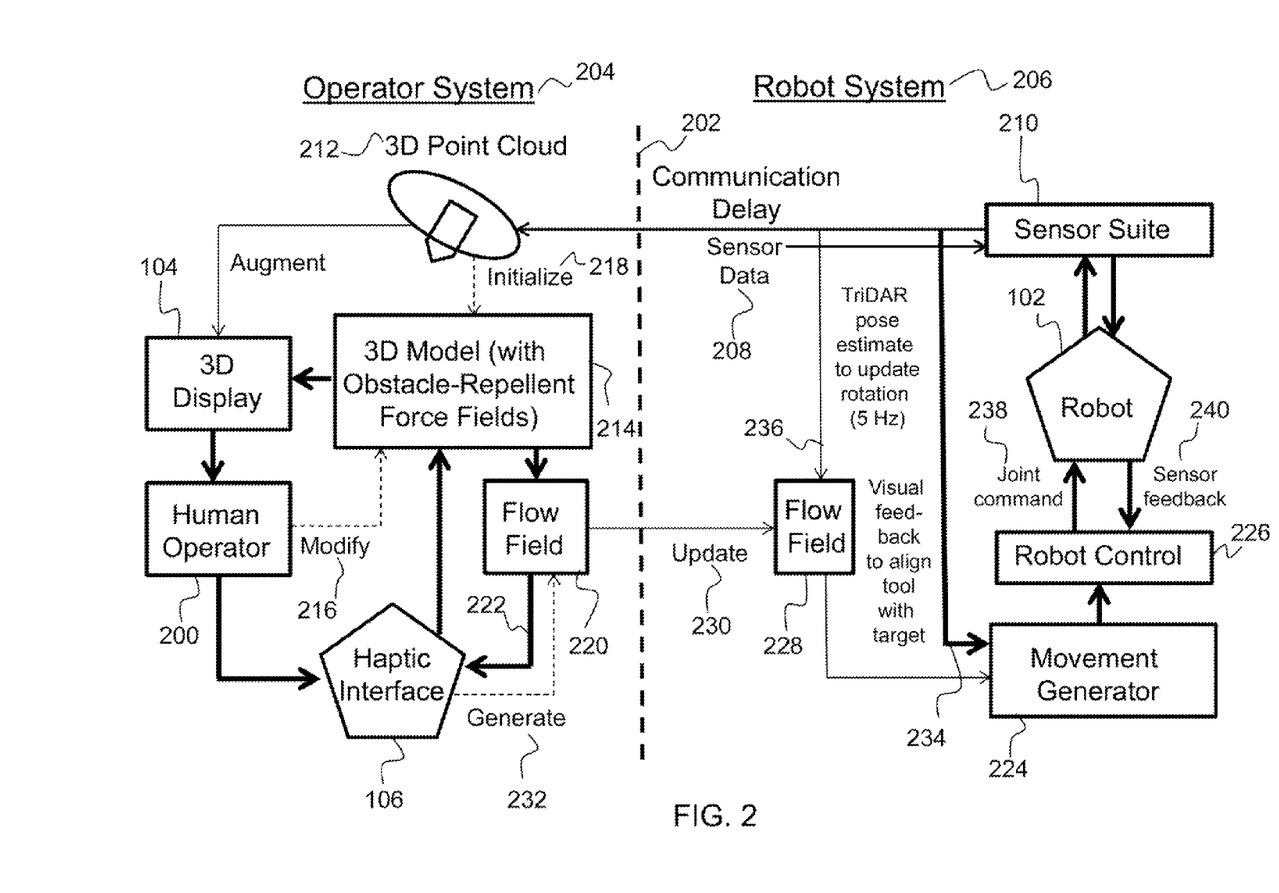
FIG. 2 illustrates the process flow of a method for tele-robotic operations over time-delayed communication links according to the principles of the present invention.

FIG. 2 illustrates the process flow of the present invention with an existing communication delay between a robot 102 and a human operator 200. The communication delay is represented by a vertical dashed line 202 separating an operator system 204 from a robot system 206. The separate closed control loops for the operator system 204 and the robot system 206 make the invention described herein insensitive to a moderate communication delay (i.e., less than 10 seconds) and limited bandwidth. Bold solid arrows represent fast (i.e., greater than 100 Hertz (Hz)) real-time control loops, unbolded solid arrows represent slow real-time loops, and dashed arrows represent occasional updates.

In the beginning of a sub-task, the robot 102 collects sensor (range) data 208 from a sensor suite 210. A non-limiting example of a sensor suite is a set of cameras and a Laser range finder. Initially, the sensor data 208 are collected from multiple viewpoints. These point cloud data are then transmitted to the human operator 200 (encrypted, if desired). There, computer software will combine the multiple views into a single 3D point cloud 212 such as by using the iterative Closest Point algorithm (see Literature Reference No. 8). If the sub-task is a continuation of a previous task, one will have data only from a single view point and these data will be combined with the previous point cloud.

In a modeling process, the human operator 200 interacts with a 3D model 214 to ensure it properly represents the 3D point cloud 212. Both the 3D model 214 and raw point cloud (3D point cloud 212) are displayed overlayed in 3D on the 3D display 104, such that the human operator 200 can correct/modify 216 the orientation of the 3D model 214. For instance, occasionally, alignment methods, such as Iterative Closest Point, get incorrect orientation estimates (e.g., 180 degrees off) that would be obvious to a human operator 200.

After the human operator 200 approves the 3D model 214 position, the 3D model's 214 position and orientation are continuously initialized 218 and updated based on the incoming point cloud (i.e., 3D point cloud 212) stream (e.g., at 2 Hz). Given models of an arm of the robot 102 and an object for manipulation (e.g., retired satellite), the human operator 200 can plan and practice robotic movements through the haptic interface 106.

The human operator 200 generates and practices robotic movements in a real-time closed loop (represented by "generate" 232) with the 3D model 214. Here, the human operator 200 guides the robotic end-effector/tool-head with the haptic interface 106. The haptic interface 106 manipulates the end-effector position and orientation of the robot in simulation, while the human operator 200 (or an assistant) can adjust the view point of the point cloud 212.

Figure 3:
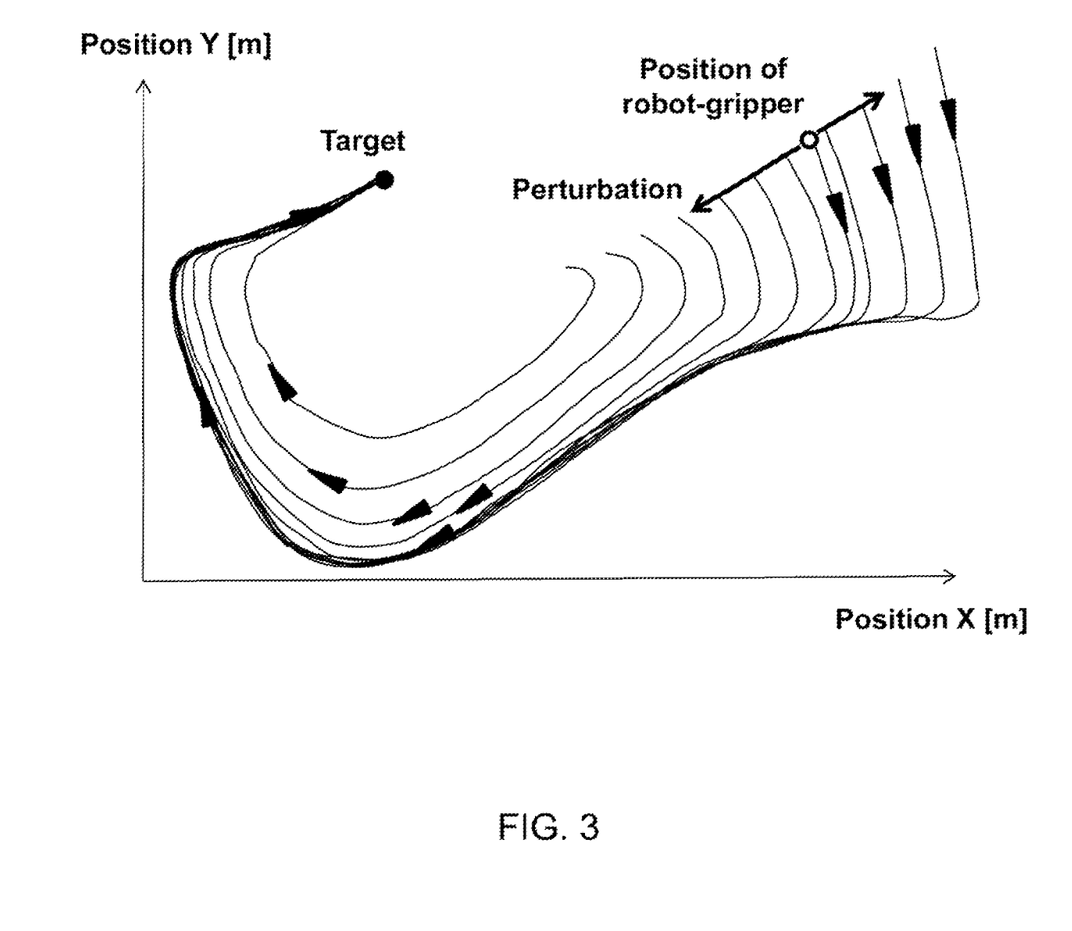
FIG. 3 illustrates a dynamical flow field according to the principles of the present invention.
Figure 4:
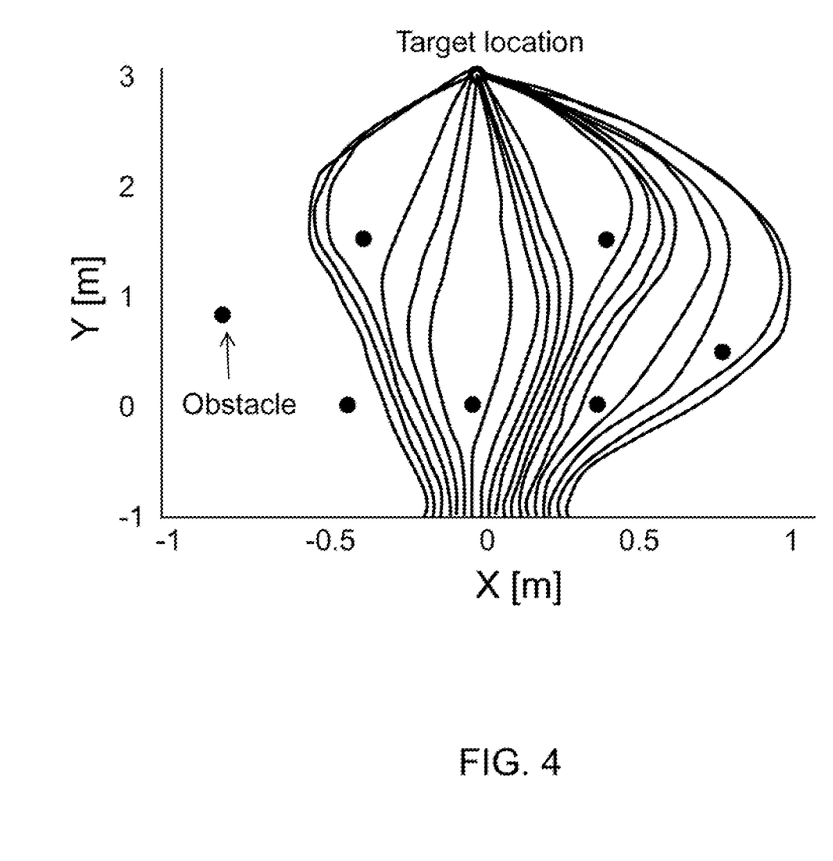
FIG. 4 illustrates a flow field according to the principles of the present invention.

The demonstrated movements ("generate" 232 in FIG. 2) are converted into a dynamic flow field, as illustrated in FIG. 3. In this figure, each curve represents a robot trajectory that will be generated for the corresponding location of the robot gripper/end-effector (here, illustrated in X-Y coordinates). All curves converge at a target position. The multitude of curves enables compensation of perturbations to the end-effector location. To convert a movement path into a flow field, a single demonstrated path is sufficient, as described in Literature Reference No. 9. The flow field forces the end-effector to move close to the demonstrated path. The orientation of the flow field will be updated according to updates in the model's position and orientation based on real data from the robot. Thus, the flow field has an advantage over a single path, which cannot take into account deviations between end-effector position and demonstrated path. The flow field may describe the movement of the robot's tool head alone, tool head and elbow, or the tool heads on two robot arms and requires only a few floating-point numbers (see Literature Reference No. 9) to upload (represented as "update" 230 in FIG. 2) to the remote robot.

As shown in FIG. 2, obstacle-repellent force fields are added to the flow field 220. The human operator 200 can label obstacles and targets. The obstacles will be augmented with repellent force fields (see Literature Reference No. 9), whose strength the human operator 200 can regulate/modify 216. To probe the strength of the obstacle-repellent force fields in the 3D model 214, the haptic device 106 provides a force feedback 222 whose strength is proportional to the value of the flow field 220 at the corresponding location. To regulate the strength of a force field 220 around one obstacle, the human operator 200 uses, for example, a 7 DOF haptic interface 106 as a 6 DOF mouse with a gripper to pull on a virtual sphere centered at the obstacle. Here, the radius of the sphere corresponds to the strength of the flow field 220.

Given the resulting flow field 220, the human operator 200 practices the robot's 102 movement through this flow field 220. For this action, the following steps have to occur: the human operator places a cursor into the flow field shown on the 3D display 104, and the cursor moves in the field according to the following flow-field equation (see Literature Reference No. 9):

$$\dot{x}=v$$

$$\dot{v}=K(g-x)-Dv-K(g-x_0)s+Kf(s)+p(x,v),$$

where x is the position of the end-effector, v its velocity, g is the target location, $x_0$ is the starting location of the movement, s is a variable that exponentially decays from 1 to 0, and K and D are parameters. $\dot{x}$ and $\dot{v}$ represent the derivative with respect to time of x and v, respectively. The expression K(g−x) auto-adjusts to the position of the target, the non-linear function f(s) contains the flow field characterizing parameters, and the expression p(x,v) represents obstacle avoidance.

Using the haptic device 106, the human operator 200 displaces the cursor, and haptic feedback is provided back to the human operator 200 proportional to the repulsive terms from the obstacles (p in the flow-field equation above). Further, additional forces providing feedback about joint limits may be added. The forces felt through the haptic device 106 allow the human operator 200 to judge joint limits, the proximity of obstacles, and potential local minima caused by the obstacles. If a problem occurs, the operator can: a) modify obstacle-repellent forces; b) re-demonstrate the entire path; or c) edit the path, which could be illustrated visually in 3D on the 3D display 104.

After movement planning and practice, the flow field 220 is uploaded (or updated 230) to the robot 102. For this communication only a few parameters are required. That is, the parameters that define the flow field, where 25 parameters per dimension are usually sufficient (see Literature Reference No. 11). These flow field parameters define the shape of the flow field.

The uploaded flow field 228 is a copy of the operator-based flow field 220. A movement generator 224 uses the uploaded flow field 228 to compute the desired robot end-effector positions. Robot control software 226 converts an end-effector position into joint angles using inverse kinematics. The robot control software 226 uses these angles and feedback of the state of the robot (sensor feedback 240) to compute control commands (e.g., joint command 238). A non-limiting example for computing such control commands is a proportional-integral-derivative (PID) controller or an impedance controller. However, the robot control as used in one aspect of the present invention is standard technology, and many possible off-the-shelf software products exist.

Here, the uploaded flow field 228 is fixed relative to the target object, the object to be reached by the robot 102 arm. To fix the orientation of the uploaded flow field 228, the movement generator 224 takes input of the orientation 236 of the target object from the sensor suite 210. The orientation of the uploaded flow field 228 is adjusted in real-time to the orientation of the target object. In addition, the target position of the movement is updated in real-time using visual feedback 234. The movement generator 224 can realize this target position update by changing a single parameter in the flow field equations (see Literature Reference No. 9).

If the target update deviates by more than a predetermined safety margin around an obstacle (e.g., approximately ten centimeters) from plan, the movement may be aborted automatically, since in this case, the field may not sufficiently accurately describe the obstacles. As an option, a multitude of robot 102 arms could be controlled simultaneously. Here, the flow fields are higher dimensional and include the positions of both end-effectors, and a coupling term between the arms links the differential equations between the dimensions.

Figure 5:
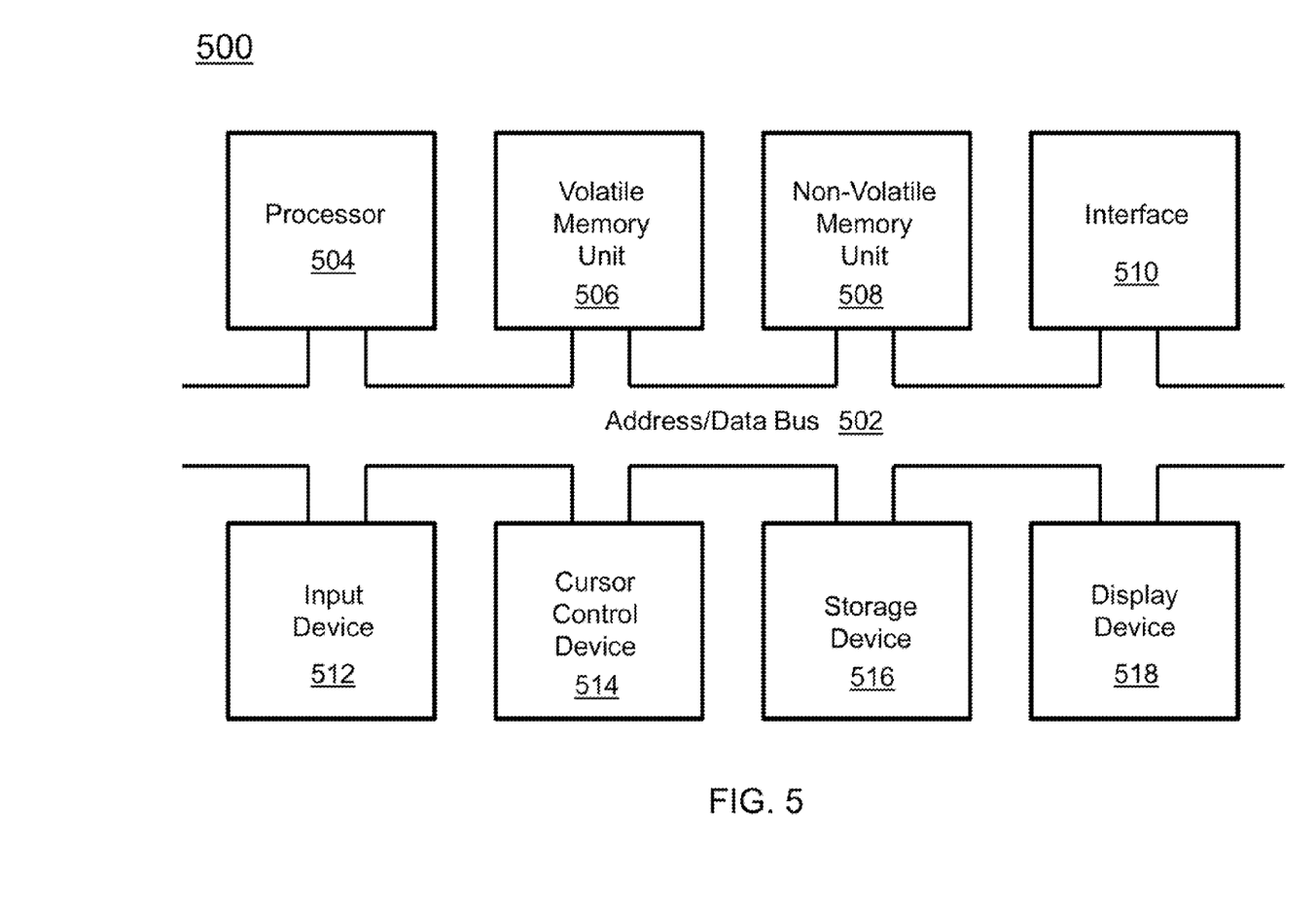
FIG. 5 is an illustration of a data processing system according to the principles of the present invention.

An example of a computer system 500 in accordance with one aspect is shown in FIG. 5. The computer system 500 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 500. When executed, the instructions cause the computer system 500 to perform specific actions and exhibit specific behavior, such as described herein.

The computer system 500 may include an address/data bus 502 that is configured to communicate information. Additionally, one or more data processing units, such as a processor 504, are coupled with the address/data bus 502. The processor 504 is configured to process information and instructions. In one aspect, the processor 504 is a microprocessor. Alternatively, the processor 504 may be a different type of processor such as a parallel processor, or a field programmable gate array.

The computer system 500 is configured to utilize one or more data storage units. The computer system 500 may include a volatile memory unit 506 (e.g., random access memory ("RAM"), static RAM, dynamic RAM, etc.) coupled with the address/data bus 502, wherein a volatile memory unit 506 is configured to store information and instructions for the processor 504. The computer system 500 further may include a non-volatile memory unit 508 (e.g., read-only memory ("ROM"), programmable ROM ("PROM"), erasable programmable ROM ("EPROM"), electrically erasable programmable ROM "EEPROM"), flash memory, etc.) coupled with the address/data bus 502, wherein the non-volatile memory unit 508 is configured to store static information and instructions for the processor 504. Alternatively, the computer system 500 may execute instructions retrieved from an online data storage unit such as in "Cloud" computing. In an embodiment, the computer system 500 also may include one or more interfaces, such as an interface 510, coupled with the address/data bus 502. The one or more interfaces are configured to enable the computer system 500 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 500 may include an input device 512 coupled with the address/data bus 502, wherein the input device 512 is configured to communicate information and command selections to the processor 500. In accordance with one aspect, the input device 512 is an alphanumeric input device, such as a keyboard, that may include alphanumeric and/or function keys. Alternatively, the input device 512 may be an input device other than an alphanumeric input device. In one aspect, the computer system 500 may include a cursor control device 514 coupled with the address/data bus 502, wherein the cursor control device 514 is configured to communicate user input information and/or command selections to the processor 500. In one aspect, the cursor control device 514 is implemented using a device such as a mouse, a track-ball, a track-pad, an optical tracking device, or a touch screen. The foregoing notwithstanding, in one aspect, the cursor control device 514 is directed and/or activated via input from the input device 512, such as in response to the use of special keys and key sequence commands associated with the input device 512. In an alternative aspect, the cursor control device 514 is configured to be directed or guided by voice commands.

In one aspect, the computer system 500 further may include one or more optional computer usable data storage devices, such as a storage device 516, coupled with the address/data bus 502. The storage device 516 is configured to store information and/or computer executable instructions. In one aspect, the storage device 516 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 518 is coupled with the address/data bus 502, wherein the display device 518 is configured to display video and/or graphics. In one aspect, the display device 518 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 500 presented herein is an example computing environment in accordance with one aspect. However, the non-limiting example of the computer system 500 is not strictly limited to being a computer system. For example, one aspect provides that the computer system 500 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 6:
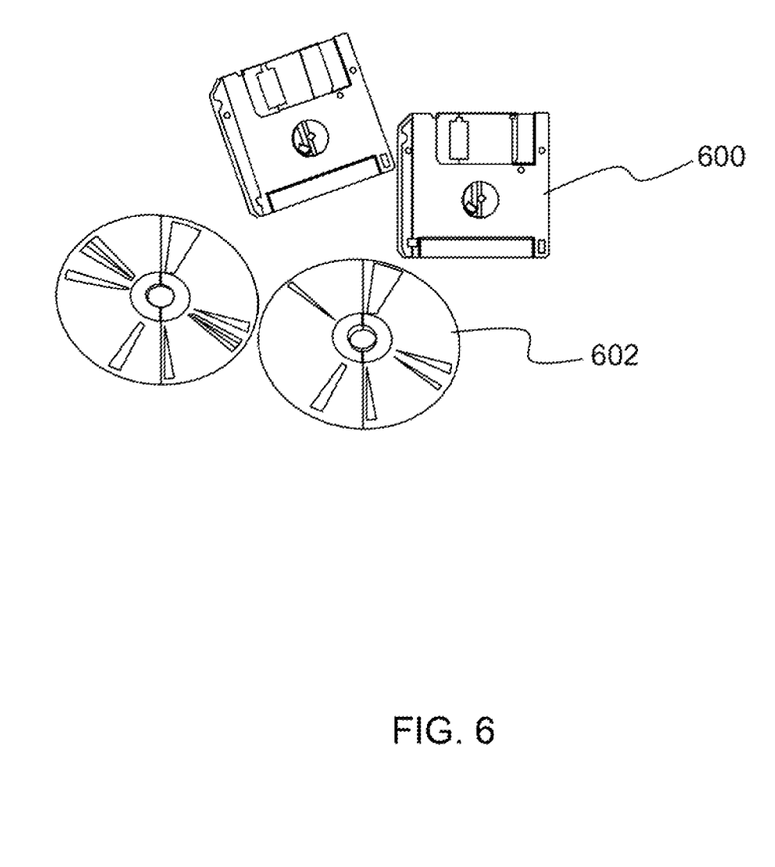
FIG. 6 is an illustration of a computer program product according to the principles of the present invention.

An illustrative diagram of a computer program product embodying an aspect of the present invention is depicted in FIG. 6. As a non-limiting example, the computer program product is depicted as either a floppy disk 600 or an optical disk 602. However, as mentioned previously, the computer program product generally represents computer readable code (i.e., instruction means or instructions) stored on any compatible non-transitory computer readable medium.

What is claimed is:

1. A system for tele-robotic operations, the system comprising:
   one or more processors and a non-transitory memory having instructions encoded thereon such that when the instructions are executed, the one or more processors perform operations of:
   acquiring sensor data from at least one sensor for sensing surroundings of a robot having at least one robotic arm for manipulating an object;
   generating a three-dimensional model of the sensed surroundings and fitting the sensor data to the three-dimensional model;
   using the three-dimensional model to generate a movement path for the at least one robotic arm;
   generating a flow field representing the movement path;
   using the flow field in a simulation to provide force feedback to a user through a haptic device, wherein the flow field comprises a set of parameters; and
   following the simulation, transmitting the set of parameters used in the simulation to the robot, wherein the set of parameters define the floss field, and wherein the flow field is used to execute a movement of the at least one robotic arm for manipulating the object,
   wherein the flow field is updated in real-time according to the sensor data.

2. The system as set forth in claim 1, wherein the flow field changes over time during execution of the movement of the at least one robotic arm.

3. The system as set forth in claim 2, wherein the one or more processors further perform an operation of continuously updating a position and as orientation of the three-dimensional model based on incoming three-dimensional point cloud data generated from the sensor data.

4. The system as set forth in claim 3, wherein the one or more processors further perform an operation of updating an orientation of the flow field according to updates in the three-dimensional model's position and orientation based on data received from the robot.

5. The system as set forth in claim 1, wherein the one or more processors further perform an operation of enabling a user to label at least one obstacle in the three-dimensional model, wherein the at least one obstacle is augmented with at least one repellent force field having a strength that the user can regulate, and wherein the haptic device provides a force feedback having a strength that is proportional to a value representing the at least one repellent force field.

6. The system as set forth in claim 5, wherein the one or more processors further perform an operation of:
  enabling the user to practice the movement path through the flow field prior to transmitting the set of parameters to the robot; and
  if a problem occurs, then enabling the user to:
    modify the at least one repellent force field;
    re-demonstrate the movement path; or
    edit the movement path.

7. A computer-implemented method for tele-robotic operations, comprising:
  an act of causing a data processor to execute instructions stored on a non-transitory memory such that upon execution, the data processor performs operations of:
  acquiring sensor data from at least one sensor for sensing surroundings of a robot having at least one robotic arm for manipulating an object;
  generating a three-dimensional model of the sensed surroundings and fitting the sensor data to the three-dimensional model;
  using the three-dimensional model to generate a movement path for the at least one robotic arm;
  generating a flow field representing the movement path;
  using the flow field in a simulation to provide force feedback to a user through a haptic device, wherein the flow field comprises a set of parameters; and
  following the simulation, transmitting the set of parameters used in the simulation to the robot, wherein the set of parameters define the flow field, and wherein the flow field is used to execute a movement of the at least one robotic arm for manipulating the object,
  wherein the flow field is updated in real-time according to the sensor data.

8. The method as set forth in claim 7, wherein the flow field changes over time during execution of the movement of the at least one robotic arm.

9. The method as set forth in claim 8, wherein the data processor further performs an operation of continuously updating a position and an orientation of the three-dimensional model based on incoming three-dimensional point cloud data generated from the sensor data.

10. The method as set forth in claim 9, wherein the data processor further performs an operation of updating an orientation of the flow field according to updates in the three-dimensional model's position and orientation based on data received from the robot.

11. The method as set forth in claim 7, wherein the data processor further performs an operation of enabling a user to label at least one obstacle in the three-dimensional model, wherein the at least one obstacle is augmented with at least one repellent force field having a strength that the user can regulate, and wherein the haptic device provides a force feedback having a strength that is proportional to a value representing the at least one repellent force field.

12. The method as set forth in claim 11, wherein the data processor further performs operations of:
  enabling the user to practice the movement path through the flow field prior to transmitting the set of parameters to the robot; and
  if a problem occurs, then enabling the user to:
    modify the at least one repellent force field;
    re-demonstrate the movement path; or
    edit the movement path.

13. A computer program product for tele-robotic operations, the computer program product comprising computer-readable instructions stored on a non-transitory computer-readable medium that are executable by a computer having a processor for causing the processor to perform operations of:
  acquiring sensor data from at least one sensor for sensing surroundings of a robot having at least one robotic arm for manipulating an object;
  generating a three-dimensional model of the sensed surroundings and fitting the sensor data to the three-dimensional model;
  using the three-dimensional model to generate a movement path for the at least one robotic arm;
  generating a flow field representing the movement path;
  using the flow field in a simulation to provide force feedback to a user through a haptic device, wherein the flow field comprises a set of parameters; and
  following the simulation, transmitting the set of parameters used in the simulation to the robot, wherein the set of parameters define the flow field, and wherein the flow field is used to execute a movement of the at least one robotic arm for manipulating the object,
  wherein the flow field is updated in real-time according to the sensor data.

14. The computer program product as set forth in claim 13, wherein the flow field changes over time during execution of the movement of the at least one robotic arm.

15. The computer program product as set forth in claim 14, further comprising instructions for causing the processor to perform an operation of continuously updating a position and an orientation of the three-dimensional model based on incoming three-dimensional point cloud data generated from the sensor data.

16. The computer program product as set forth in claim 15, further comprising instructions for causing the processor to perform an operation of updating an orientation of the flow field according to updates in the three-dimensional model's position and orientation based on data received from the robot.

17. The computer program product as set forth in claim 13, further comprising instructions for causing the processor to perform an operation of enabling a user to label at least one obstacle in the three-dimensional model, wherein the at least one obstacle is augmented with at least one repellent force field having a strength that the user can regulate, and wherein the haptic device provides a force feedback having a strength that is proportional to a value representing the at least one repellent force field.

18. The computer program product as set forth in claim 17, further comprising instructions for causing the processor to perform operations of:
  enabling the user to practice the movement path through the flow field prior to transmitting the set of parameters to the robot; and
  if a problem occurs, then enabling the user to:
    modify the at least one repellent force field;
    re-demonstrate the movement path; or
    edit the movement path.

* * * * *